(12) United States Patent
Pudipeddi

(10) Patent No.: US 7,640,247 B2
(45) Date of Patent: Dec. 29, 2009

(54) DISTRIBUTED NAMESPACE AGGREGATION

(75) Inventor: Ravisankar V. Pudipeddi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 280 days.

(21) Appl. No.: 11/349,474

(22) Filed: Feb. 6, 2006

(65) Prior Publication Data

US 2007/0198458 A1     Aug. 23, 2007

(51) Int. Cl.
- *G06F 7/00* (2006.01)
- *G06F 12/00* (2006.01)
- *G06F 17/30* (2006.01)
- *G06F 15/16* (2006.01)

(52) U.S. Cl. .................. 707/10; 707/201; 707/E17.01; 709/219

(58) Field of Classification Search .................. 707/200, 707/10, 201, E17.01; 709/219
See application file for complete search history.

(56) References Cited

U.S. PATENT DOCUMENTS

| | | | |
|---|---|---|---|
| 5,465,365 A | 11/1995 | Winterbottom | |
| 5,617,568 A | 4/1997 | Ault | |
| 5,689,701 A | 11/1997 | Ault | |
| 5,842,214 A | 11/1998 | Whitney | |
| 6,173,293 B1 | 1/2001 | Thekkath | |
| 6,256,031 B1 | 7/2001 | Meijer | |
| 6,408,298 B1 | 6/2002 | Van | |
| 6,421,684 B1 | 7/2002 | Cabrera | |
| 6,546,415 B1 | 4/2003 | Park | |
| 6,931,410 B2 * | 8/2005 | Anderson et al. ........... 707/100 |
| 7,430,513 B2 * | 9/2008 | Kirkland et al. ............. 705/1 |
| 2002/0120763 A1 * | 8/2002 | Miloushev et al. .......... 709/230 |
| 2003/0131020 A1 | 7/2003 | Karamanolis et al. |
| 2003/0187854 A1 | 10/2003 | Fairweather |
| 2003/0236954 A1 * | 12/2003 | Keohane et al. ............. 711/158 |
| 2004/0024786 A1 * | 2/2004 | Anderson et al. ........... 707/200 |
| 2004/0133606 A1 * | 7/2004 | Miloushev et al. .......... 707/200 |
| 2004/0243646 A1 * | 12/2004 | Teodosiu et al. ............ 707/200 |
| 2005/0015413 A1 * | 1/2005 | Teodosiu et al. ............ 707/201 |
| 2005/0216523 A1 * | 9/2005 | Sakaguchi et al. .......... 707/201 |
| 2005/0240553 A1 | 10/2005 | Diggs et al. |
| 2006/0080353 A1 * | 4/2006 | Miloushev et al. .......... 707/102 |
| 2006/0085428 A1 * | 4/2006 | Bozeman et al. ............ 707/10 |
| 2006/0230076 A1 * | 10/2006 | Gounares et al. ............ 707/200 |
| 2007/0055703 A1 * | 3/2007 | Zimran et al. ............... 707/200 |
| 2007/0088669 A1 * | 4/2007 | Jaschek et al. ................. 707/1 |
| 2007/0088702 A1 * | 4/2007 | Fridella et al. ................ 707/10 |

OTHER PUBLICATIONS

Microsoft TechNet, "How DFS Works", Mar. 28, 2003.*
Christopher R. Hertel, "Implementing CIFS: SMB", 2003, Chapter 2 available online: http://web.archive.org/web/20031203151005/http://ubiqx.org/cifs/SMB.html.*

(Continued)

*Primary Examiner*—Mohammad Ali
*Assistant Examiner*—Brannon W Smith
(74) *Attorney, Agent, or Firm*—Workman Nydegger

(57) ABSTRACT

Aspects of the subject matter described herein relate to distributed namespace aggregation. In aspects, a distributed file system is extended to allow multiple servers to seamlessly host files associated with aggregated links and/or aggregated roots. A request for a directory listing of an aggregated link or root may cause a server to sniff multiple other servers that host files associated with the link or root to create and return a concatenated result. Sniffing may also be used to determine which servers host the file to which the client is requesting access. Altitude may be used to determine which servers to make visible to the client and may also be used to determine which servers are in the same replica group and which are not.

15 Claims, 10 Drawing Sheets

OTHER PUBLICATIONS

Tony Northrup, "Distributed File System", 1998 available online: http://www.windowsitlibrary.com/Content/386/15/2.html.*

Reed et al, "Security Considerations When Designing a Distributed File System Using Object Storage Devices", IEEE, 2003.*

Boswell, William. Inside Windows Server 2003, 2003, Pearson Education, Chapter 16.*

"StorageX, Aggregate & Simplify File System Management with NuView StorageX", 2002.*

Vnodes: An Architecture for Multiple File Systm Types in Sun UNIX, http://www.arl.wustl.edu/~fredk/Courses/cs523/fall01/Papers/kleiman86vnodes.pdf, Date: 2001.

The 4.4BSD NFS Implementation, htt;://www.smrtlc.ru/~apetrov/doc/unix/nfs.pdf, Date: 1996.

The LOCUS Distributed Operating System, http://delivery.acm.org/10.1145/810000/806615/p49-walker.pdf?key1=806615&key2=9414773311&coll=GUIDE&CFID=62160948&CFTOKEN=93674694, Date: 1983.

Calsoft, http://www.calsoftinc.com/focusareas/stroag.htm, Date: Dec. 5, 2005.

Versatility and Unix Semantics in Namespace Unification, htt;\p://www.fsl.cs.sunysb.edu/docs/unionfs-tos/unionfs.html, Date: Dec. 5, 2005.

* cited by examiner

DISTRIBUTED NAMESPACE AGGREGATION

BACKGROUND

Many enterprises have thousands of employees each of which may be provided with one or more computers to accomplish their work. The files generated, maintained, and accessed by these employees may number in the millions or more. Furthermore, these files may be distributed on servers located around the world. Managing, protecting, and accessing these files is becoming increasingly more complicated.

SUMMARY

Briefly, aspects of the subject matter described herein relate to distributed namespace aggregation. In aspects, a distributed file system is extended to allow multiple servers to seamlessly host files associated with aggregated links and/or aggregated roots. A request for a directory listing of an aggregated link or root may cause a server to sniff multiple other servers that host files associated with the link or root to create and return a concatenated result. Sniffing may also be used to determine which servers host the file to which the client is requesting access. Altitude may be used to determine which servers to make visible to the client and may also be used to determine which servers are in the same replica group and which are not.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "one or more aspects". Identifying aspects of the subject matter described in the Detailed Description is not intended to identify key or essential features of the claimed subject matter.

The aspects described above and other aspects will become apparent from the following Detailed Description when taken in conjunction with the drawings, in which:

DETAILED DESCRIPTION

Exemplary Operating Environment

Figure 1:
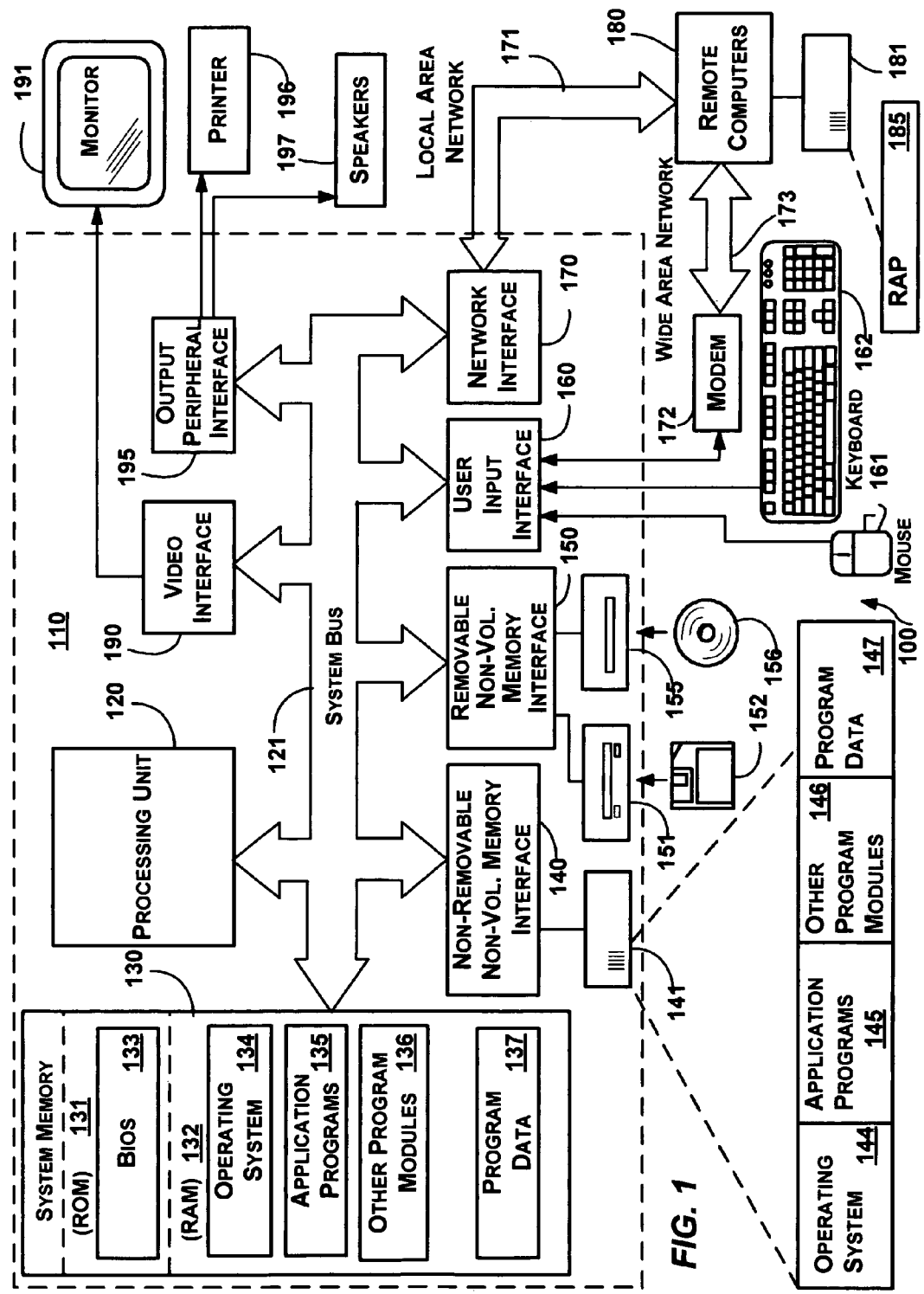
FIG. 1 is a block diagram representing a computer system into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like. A device capable of executing instructions (such as one of the above devices) is sometimes referred to as a machine.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Distributed Namespace Aggregation

Figure 2:
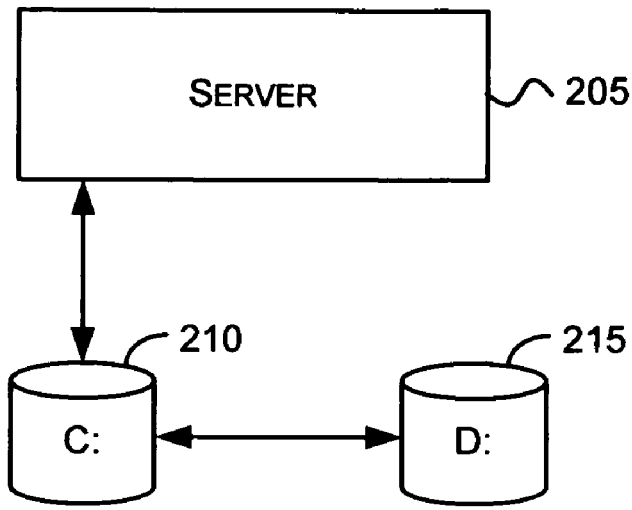
FIG. 2 is a block diagram representing an exemplary environment in which aspects of the subject matter described herein may operate.

FIG. 2 is a block diagram representing an exemplary environment in which aspects of the subject matter described herein may operate. The environment may include a server 205 that includes volumes 210 and 215. The server 205 is an example of a computer 110 described in conjunction with FIG. 1. Other general purpose or special purpose computing system environments or configurations described in conjunction with FIG. 1 may also be substituted for server 205.

Although a server (e.g., server 205) may provide access to services and resources to other processes (sometimes called client computers or simply clients), the server may also request services and resources from other processes and may act as a client computer for some or a great portion of its operation without departing from the spirit or scope of the subject matter described herein. Furthermore, a process on a computer may be a server in one interaction and may be a client in another interaction. In providing a service to a client, a server may also request one or more services from other servers. As used herein, a server may comprise a process executing on one or more computers and/or one or more computers which provide access to services or resources.

The volumes 210 and 215 may be located any physical storage, volatile or non-volatile, read only, write only, or read-write, accessible by the server 205. Typically, the volumes 210 and 215 reside on physical devices (e.g., hard drives) contained in the server 205, but they may be connected via communication link and reside physically outside the server 205 without departing from the spirit or scope of the subject matter described herein.

Some file systems are capable of storing and providing access to millions or billions of files and directories (hereinafter both referred to simply as "files"). While a file system may be capable of storing millions of files, if these millions of files are concurrently accessed by thousands of users, the system may not be able to provide access to the files in a timely manner. For example, if hundreds or thousands of users simultaneously request access to files on the volume 210, it may take seconds or minutes to provide access to the requested files or portions thereof. The physical device upon which the volume 210 is placed may provide fast access (e.g., in the millisecond range), and may even have a cache that is able to provide access to cached files very quickly (e.g., in the 10 s to 100 s of nanoseconds range), but when thousands and tens of thousands of users simultaneously request access to files, the rate at which these accesses are satisfied may be unsatisfactory.

Furthermore, if the file system becomes corrupted, all files may become unavailable until the file system is repaired or restored from a backup. The time it takes to repair the file system or restore the file system from a backup is typically proportional to the number of files and may take and unacceptably long time for large datasets.

In one implementation, the rate may be increased by providing one or more other volumes (preferably on different physical devices) and mounting the other volumes on the first volume. In the implementation shown in FIG. 2, a line is drawn between volume 210 and 215. This line represents that volume 215 is mounted on volume 210. A volume may be mounted on a particular directory of another volume such that requests associated with subdirectories and files of the directory are routed to the mounted volume.

Mounting additional volumes may allow the server 205 to service requests using multiple physical devices. This may increase the rate at which requests may be serviced as the multiple physical devices may be utilized in parallel. Placing the files into separate volumes (e.g., through mounting additional volumes) may address the issue of repair and unavailability of all files as only the files on a particular volume may have downtime if the volume is corrupt or has failed. Placing the files in separate volumes may not, however, effectively address server crashes.

Even with multiple volumes on different physical devices, however, a server 205 may not be able to service requests at an acceptable rate. Furthermore, such a configuration may be susceptible to failure as if the server 205 crashes, valuable data may be inaccessible until the server 205 is rebooted or another server is configured to provide access to the files.

In another implementation, a distributed file system (DFS) may be utilized to service file-related requests. The DFS may allow a system administrator to construct a global namespace for a file system that utilizes one or more servers. Each file in the DFS may be accessed using one or more universal naming convention (UNC) names. In one implementation, a UNC name (sometimes called UNC path) may comprise two slashes (e.g., "\\") followed by a path having components that are delimited by slashes. For example, one UNC name may comprise \\Develop\\Binaries\executable.exe. The first component of the UNC name (i.e., Develop) may identify a domain name. The second component of the UNC name (i.e., Binaries) may identify a share name (also called a DFS root).

A domain name may be resolved to a domain controller via a domain name service (DNS). A domain may be associated with more than one domain controllers, each of which may be registered with the DNS. In resolving a domain name to a domain controller, the domain name service may load balance requests among domain controllers registered with the DNS for the domain.

A computer that has asked for a domain name to be resolved may be given a UNC name that includes as its first component the name of a domain name controller associated with the domain. The computer may then ask the domain name controller to resolve the share name. In response, the domain name controller may respond with a referral that includes a list of servers upon which the DFS root is hosted. The DFS root may be replicated on each of the servers such that files in the DFS root or subdirectories thereof may be synchronized across the servers. Thus, on each of the servers, the computer may access files associated with the share name. For example, the domain name controller may return a referral that includes:

\\windev0\binaries
\\windev1\binaries
\\windev2\binaries where each UNC path identifies a physical server that hosts a DFS root (sometimes referred to as a DFS root server) and a directory on that server corresponding to the DFS root.

The list of UNC paths included in the referral may be ordered in a variety of ways. For example, the list may be ordered by network cost for the computer to reach the servers. This may be determined by the active directory or subnet in which the computer resides as well as the active directories and subnets of the servers. If two or more DFS root servers have the same network costs for the computer, the domain controller may randomly order the two or more servers in the list to load balance requests to the two or more DFS root servers.

In one implementation, the computer may attempt to access the file via the first server indicated in the referral. If the first server is unavailable or unreachable to the computer, the computer may then attempt to access the file via the second server indicated in the referral. If the second server is unavailable or unreachable to the computer, the computer may attempt to access the file via the third server and so on. By returning a list including a plurality of servers, fault tolerance may be increased such that if one or more servers are unavailable or unreachable, the computer may access the file via another server.

In one implementation, in addition to allowing regular subdirectories of any level, a file system may allow direct subdirectories (i.e., one level deep) of a DFS root to be links. A link may be associated with a plurality of UNC paths. When a computer attempts to access a file having a link component in its path, the computer may be referred to one or more other servers and paths based on the link. The referral may include a list of UNC paths which may be ordered as described previously.

Figure 3:
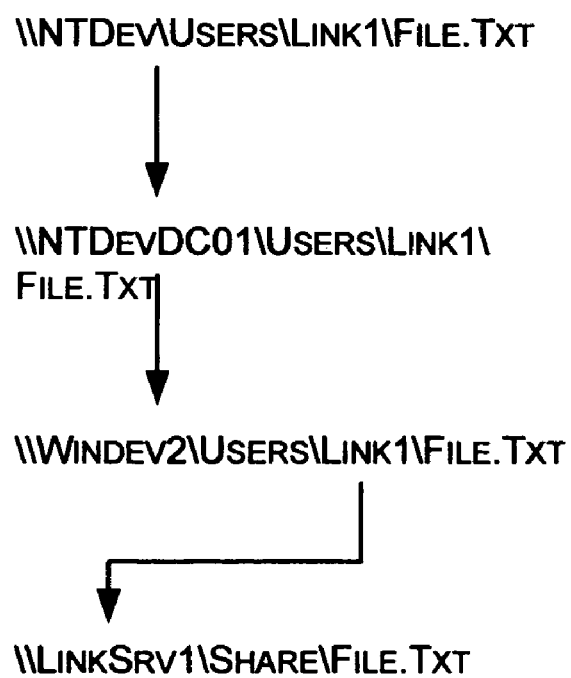
FIG. 3 is a diagram representing exemplary UNC path modifications that may occur in resolving a UNC path in accordance with aspects of the subject matter described herein.

FIG. 3 is a diagram representing exemplary UNC path modifications that may occur in resolving a UNC path in accordance with aspects of the subject matter described herein. A client may attempt to open a file associated with a UNC path 305 of \\NTDev\Users\Link1\File.Txt. In doing so, the client may access a DNS server. The DNS server may resolve the UNC path \\NTDev\Users to multiple domain controllers (e.g., NTDevDC01, NTDevDC02, . . . , NTDevDCNN) and return a list of target UNC paths (e.g., \\NTDevDC01\Users, \\NTDevDC02\Users, . . . , \\NTDevDCNN\Users) corresponding to \\NTDev\Users.

The client may rewrite the initial portion of the original UNC path (e.g., \\NTDev\Users) with the first of the target UNC paths (e.g., \\NTDevDC01\Users) and attempt to open the file using the new UNC path (e.g., \\NTDevDC01\Users\Link1\File.Txt). In sending the request and updated UNC path to the domain controller (e.g., NTDevDC01), the client may receive a message (e.g., STATUS_PATH_NOT_COVERED) that indicates that the client should request a referral from the domain controller NTDevDC01.

The client may then send the updated UNC path and request a referral from the domain controller NTDevDC01. In response, the domain controller may provide a referral that includes a first target having a UNC path 315 of \\Windev2\Users. The client may then rewrite the updated UNC path with the first target to obtain an updated UNC path (e.g., \\Windev2\Users\Link1\File.txt) and attempt to open a file corresponding to the updated UNC path.

In sending the request and updated UNC path to the server (e.g., Windev2), the client may receive a message (e.g., STATUS_PATH_NOT_COVERED) that indicates that the client should request a link referral from the server. The client may then send the updated UNC path and request a link referral from the server Windev2. In response, the server may provide a link referral that includes a first target having a UNC path 320 of \\LinkSrv1\Share. The client may then rewrite the updated UNC path with the first target to obtain a new updated UNC path (e.g., \\LinkSrv1\Share\File.txt) and attempt to open a file corresponding to the updated UNC path.

Although the referrals above have been referred to as link referrals and as referrals (without "link"), in implementations, both types of referrals may be formatted similarly or identically. In particular, each type of referral may include a source path (e.g., \\NTDev\Users, \\NTDevDC01\Users, or \\Windev2\Users\Link1) and one or more target paths to which the source path corresponds (e.g., \\NTDevDC01\Users, \\Windev2\Users, \\LinkSrv1\Share, respectively). After receiving a referral, a client may then rewrite the source portion of the UNC path with one of the target paths (e.g., the first one in the list) to create an updated UNC path which may then be used for the next stage of the process. For example, the following source UNC paths may be rewritten with their associated target UNC paths:

\\NTDEV\Users→\\NTDevDC01\Users
\\NTDevDC01\Users→\\Windev2\Users
\\Windev2\Users\Link1→\\LinkSrv1\Share Each time a client receives targets for a given source UNC path, the client may store the source UNC path together with the targets in a cache, so that the client may quickly obtain a target in subsequent lookups (e.g., without querying servers). A time to live (TTL) may also be stored with or associated with each entry. The TTL may be provided by the server providing the referral. After the TTL has expired, the client may disregard a cached entry and re-obtain the information from a server as described previously. Note that by providing TTL of 0, a client may be caused to obtain the information each time from a server as described previously (e.g., instead of caching returned information).

Links allow direct subdirectories of a DFS root to be hosted by different servers as needed. A system administrator or the like, however, may be needed to configure, delete, and manage the links. Depending on how dynamic the data associated with the links is, this may involve substantial administrative time. Furthermore, some file systems may impose or have a practical limit (e.g., 5,000) on the number of links that may reside in any particular DFS root.

In one DFS configuration, the first component of a UNC path may comprise a server name (instead of a domain name). This DFS configuration may allow for only one DFS root. On such configurations, the maximum number of links may be increased (e.g., to 30,000). Unfortunately, even 30,000 links may not be sufficient for some uses.

Figure 4:
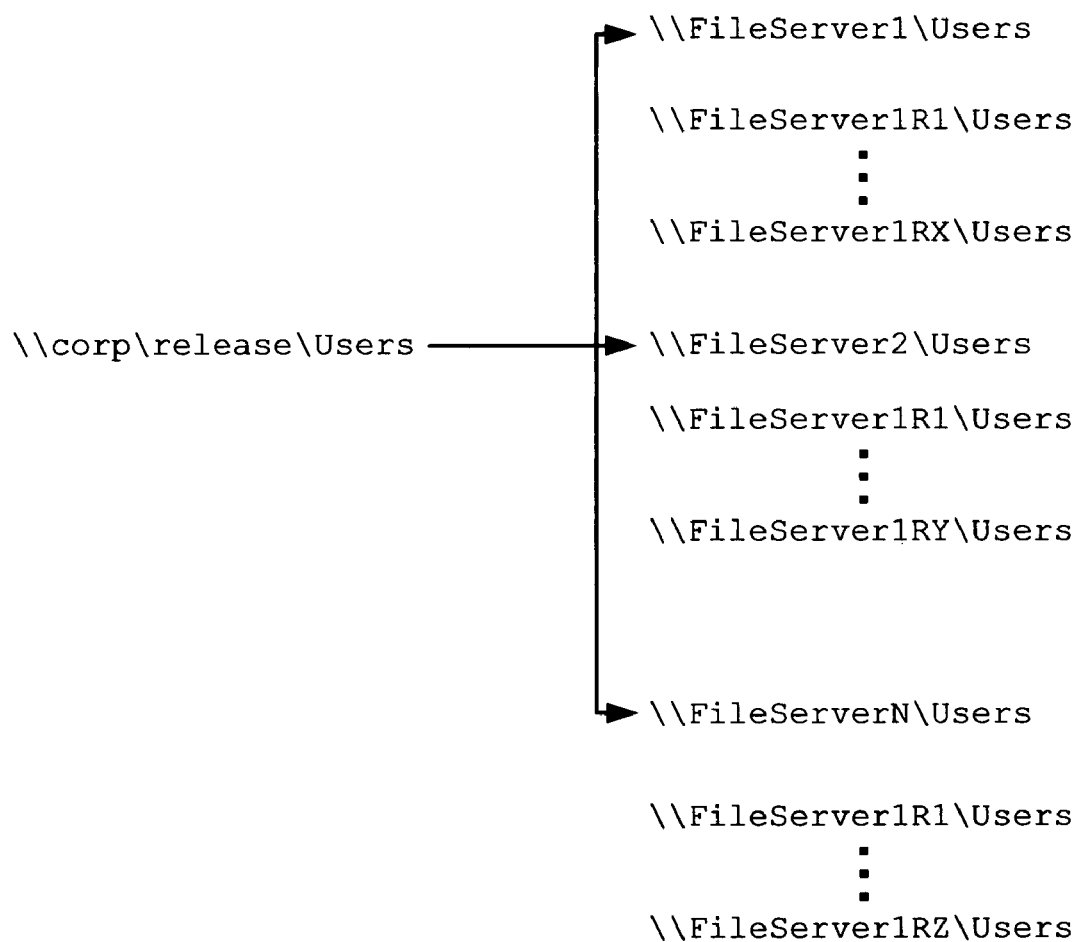
FIG. 4 is a diagram illustrating an exemplary aggregated link in accordance with aspects of the subject matter described herein.

In one embodiment, DFS links may be aggregated. For example, referring to FIG. 4, \\corp\release\Users may comprise an aggregated DFS link that points to N different link targets: \\FileServer1\Users, \\FileServer2\Users, . . . , \\FileServerN\Users. Each of the different link targets may be replicated on a number of other servers (represented by servers having a suffix of RX, RY, and RZ).

Each of the shares has a distinct top level directory. For instance, a dir (i.e., directory listing command) of \\FileServer1\Users may yield User1, User2, . . . , User50. A dir of \\FileServer2\Users may yield User51, User52, User53, . . . , and User60. A dir of \\corp\release\Users, however, may yield all of User1, User2, . . . , User51, . . . , User60, . . . . To accomplish this, each aggregated link may include a new flag in a type field for the link which identifies the link as an aggregated link.

In another embodiment, if the same folder exists on a multiple targets, the files of the multiple targets may be presented in a unionized manner when exposing them to a client. For example, directory enumeration of a link may combine both trees. In this embodiment, the referral cache of a link may be disabled (e.g., the TTL may be set to 0). In addition, hard conflicts may occur if non-directory files having the same name are present in the same path on one or more targets. If this occurs, altitude (described below) may be used to determine which non-directory file to expose to the client.

In one embodiment, each link target may be assigned or associated with an altitude. The altitude may be used to determine which folder to make visible to a client when there is a conflict at the root level of the target. For example, if both \\FileServer1\Users and \\FileServer2\Users each include a file called Jack, then a directory of \\corp\release\Users may display the Jack of the target having the highest altitude. Furthermore, a request to access \\corp\release\Users\Jack may access the file Jack on the target having the highest altitude.

When a link is an aggregate link, the altitude may also be used to determine which link targets are replicas and which link targets are aggregates. Link targets with equal altitudes may be considered replicas of each other and may be considered to belong to the same replica group. Link targets with non-equal altitudes may be considered to belong to separate replica groups. One link target from each replica group may be used when performing some operations (e.g., dir) on link targets associated with an aggregate link.

Figure 8:
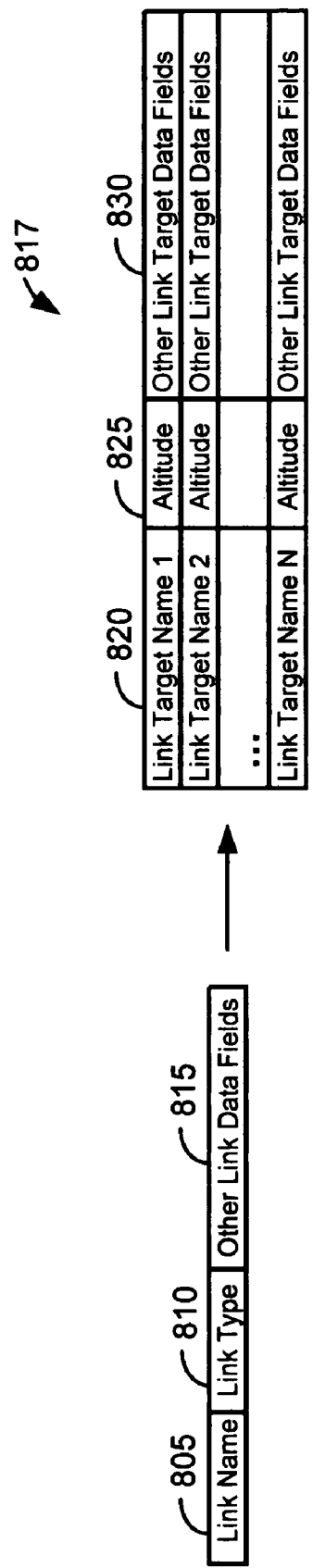
FIG. 8 is a diagram depicting an exemplary data structure that may be used for aggregating links in accordance with aspects of the subject matter described herein.

FIG. 8 is a diagram depicting an exemplary data structure that may be used for aggregating links in accordance with aspects of the subject matter described herein. On a server, a link data structure may include a link name 805, a link type 810, and other link data fields 815. In one embodiment, the link name 805 may include just the link component of a path. For example, in \\DFSRoot\Share\Link1\file.txt, the link component is "Link1".

The link type 810 may comprise flags. One of the flags of the link type 810 may indicate whether the link is an aggregated link. If the flag does not indicate that the link is an aggregated link, the link targets 817 may be considered to be replicas that belong to the same replica group.

The other link data fields 815 may include a TTL, a comment field, and other fields as needed or desired.

Link targets 817 may include data for each target of a link. The data may include a link target name 820, an altitude 825, and other link target data fields 830. The link target name 820 includes a target name (e.g., \\LinkServer\Share1) for the link. The altitude 825 includes a numeric value that may be used as described previously. The other link target data fields 830 may include a priority field (e.g., for ordering targets from the same site) and other data associated with a link target.

Figure 5:
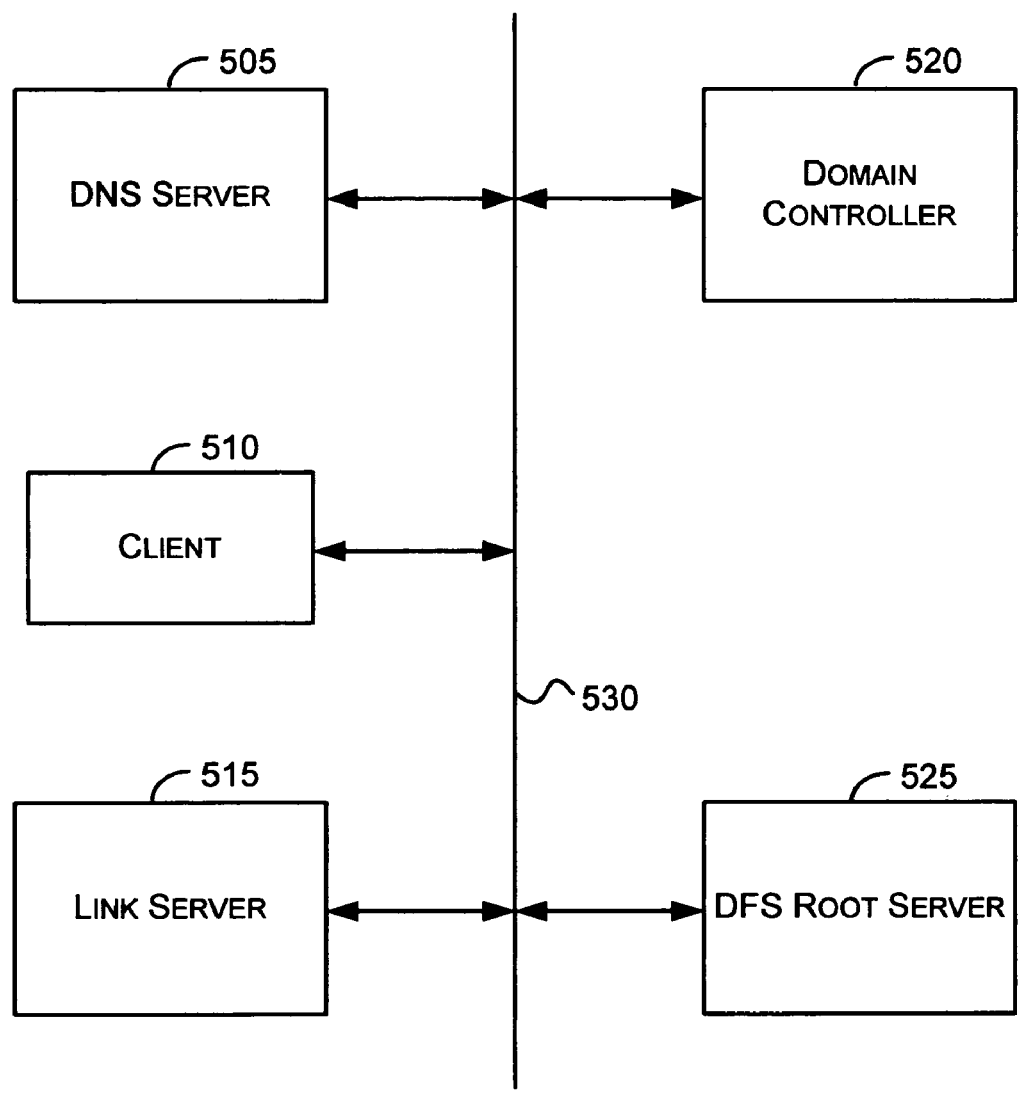
FIG. 5 is a block diagram that generally represents components of a system in which aspects of the subject matter described herein may operate.

FIG. 5 is a block diagram that generally represents components of a system in which aspects of the subject matter described herein may operate. The components include a DNS server 505, a client 510, a link server 515, a domain controller 520, and a DFS root server 525 connected via a network. While only one domain controller 520, link server 515, and DFS root server 525 is shown, in practice there may one or more of each of these.

Figure 6:
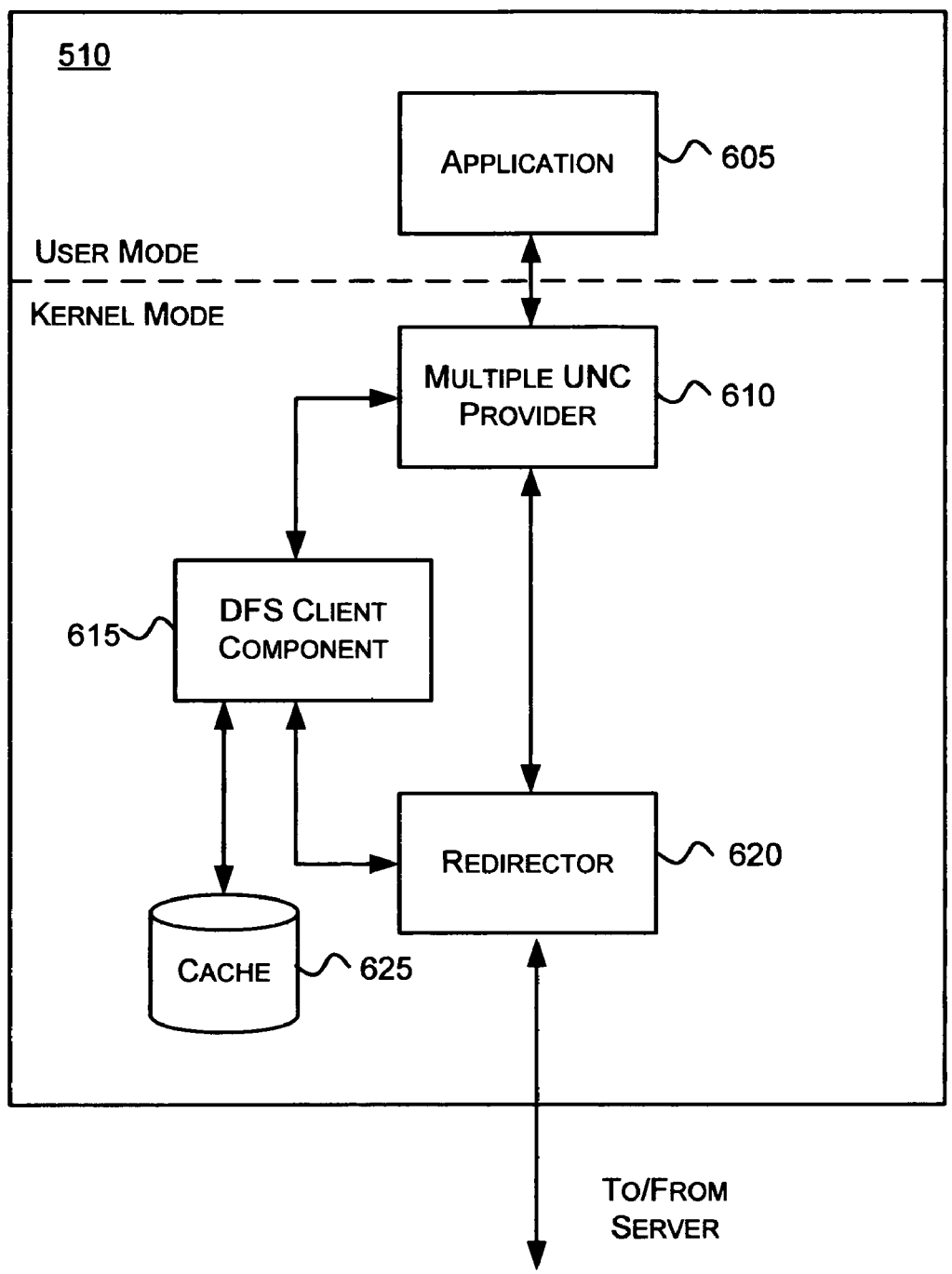
FIG. 6 is a block diagram that generally represents some components of a client in accordance with aspects of the subject matter described herein.

The client 510 may include components as described in more detail in conjunction with FIG. 6. One or more of these components may be used to communicate with the domain controller 520, the DFS root server 525, and the link server 515 using a DFS protocol. Similarly, each of the domain controller 520, the DFS root server 525, and the link server 515 may include one or more components to communicate with clients via the DFS protocol as described in more detail in conjunction with FIG. 7.

FIG. 6 is a block diagram that generally represents some components of a client in accordance with aspects of the subject matter described herein. The client 510 may include an application 605 that desires to access a file of a file system. To do so, the application 605 may send a request to a multiple UNC provider (MUP) 610.

The MUP 610 may comprise a networking component that handles input/output (I/O) requests for a file or device associated with a UNC name. If the UNC name is a DFS path, the MUP 610 may send the UNC name to the DFS client component 615 to resolve the UNC name to a physical UNC path. Using the physical UNC name, the MUP 610 may then poll the redirectors and find a redirector (e.g., redirector 620) that handles the physical UNC name. The DFS client component 615 may work in conjunction with the cache 625 and the redirector 620 to resolve the UNC name to a physical UNC path.

For example, first the MUP 610 may determine whether the path is a DFS path. In one embodiment, a DFS path starts with \\ServerName\RootName or \\DomainName\RootName. If the path is a DFS path, the MUP 610 may send the path to the DFS client component 615 for resolving. The DFS client component 615 may determine whether a portion of the UNC path is stored in the cache 625 and if the TTL for the entry has not expired. If so, the DFS client component 615 may obtain the entry from the cache 625 and rewrite the UNC path to obtain an updated UNC path. The cache 625 may include DNS resolutions, DFS root referrals, and link referrals. In one embodiment, the cache 625 may comprise three separate caches each devoted to a particulate type of information.

The DFS client component 615 may query the cache 625 multiple times as it resolves a UNC path. If the cache 625 includes a source UNC path that matches a beginning portion of the current UNC path, the DFS client component 615 may rewrite the beginning portion of the current UNC path with a target UNC path associated with the source UNC path. When the cache 625 no longer includes a source UNC path that matches a beginning portion of the current UNC path, the DFS client component 615 may send the current UNC path to the redirector.

The DFS client component 615 may interact with a DFS server (not shown) via the redirector 620. In interacting with the DFS server, the DFS client component 615 may request referrals in response to messages (e.g., STATUS_PATH_NOT_COVERED) as described previously. When the client component 615 receives a referral, the client component 615 may store the referral in the cache 625 together with a TTL.

The redirector 620 is able to communicate with servers via a file system protocol. Exemplary protocols include Server Message Block (SMB), Common Internet File System Protocol (CIFS), NetWare Core Protocol (NCP), and Network File System (NFS). Although some exemplary protocols have been indicated, any protocol suitable for communicating with servers of a particular file system may be used without departing from the spirit or scope of aspects of the subject matter described herein.

Figure 7:
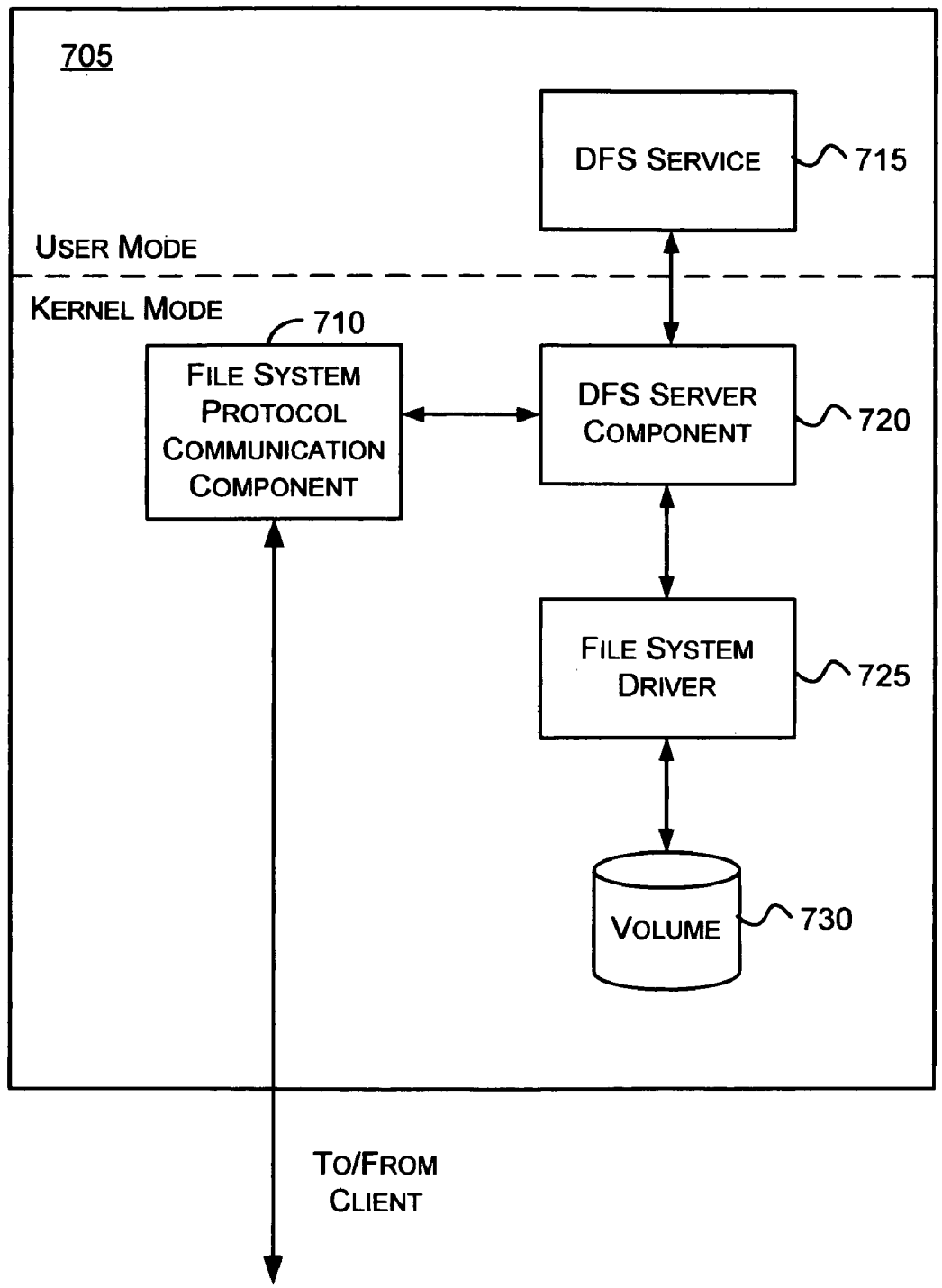
FIG. 7 is a block diagram that generally represents some components of a server in accordance with aspects of the subject matter described herein.

FIG. 7 is a block diagram that generally represents some components of a server in accordance with aspects of the subject matter described herein. A server 705 may include a file system protocol communication component 710, a DFS service 715, a DFS server component 720, a file system driver 725, and a volume 730.

The file system protocol communication component 710 is able to communicate with clients requesting access to a file system. When the file system protocol communication component 710 receives a request to open a file, it requests that a file corresponding to the request be opened on the server 705. If the file path includes a link, an error message (e.g., "STATUS_REPARSE") may be generated together with other data. This error message and data may be passed to the DFS server component 720. The DFS server component 720 may change the error message (e.g., to "STATUS_PATH_NOT_COVERED") and allow the modified message to be returned to the client. The client may then ask for a referral as previously indicated.

The DFS server component 720 may be implemented as a filter. In some embodiments, a filter comprises any object that is capable of examining I/O sent to and from a file system. A filter may change, complete, or abort the I/O or perform other actions based thereon.

A filter may generate its own I/O request which may then be passed to other filters. For example, an anti-virus filter may wish to read a file before it is opened. A filter may stop an I/O request from propagating further and may report a status code (e.g., success or failure) for the I/O request. A filter may store data in memory and persist this data on disk. In general, a filter may be created to perform any set of actions that may be performed by a kernel-mode or user-mode process and may be reactive (e.g., wait until it receives I/O requests before acting) and/or proactive (e.g., initiate its own I/O requests or perform other actions asynchronously with other I/O requests directed to the file system).

In this case, the DFS server component 720 watches for DFS related I/O sent to and from the file system driver 725 and takes action as appropriate. For example, when the file system driver 725 returns "STATUS_REPARSE" in response to a request sent from the file system protocol communication component 710, the DFS server component 720 knows to modify the message to cause the client to ask for a referral. Note that the DFS server component 720 may watch for "STATUS_REPARSE" messages associated with reparse tags that match the DFS reparse tag and may ignore messages having other reparse tags.

When the client sends a request for a referral (and passes the complete DFS path), the file system protocol communication component 710 passes the referral request to the DFS server component 720 which communicates with the DFS service 715 to fulfill the request. In communicating with the DFS service 715, the DFS server component 720 typically passes the complete DFS path. The DFS service 715 may examine the DFS path to determine whether it includes a beginning portion (e.g., \\DomainController\DFSRoot, \\DFSRootServer\DFSRoot\Link) that maps to one or more paths. If so, the DFS service 715 may use a mapping database or similar structure to look up one or more paths to which the beginning portion maps. If there is more than one path, the DFS service 715 may order the paths as described previously. The DFS service 715 may then place the one or more paths into a referral pass the referral back to the DFS server component 720. The DFS server component 720 may then send this referral back to the client.

When the client requests to open a file obtained through an aggregated link, the DFS server component 720 may first return a "STATUS_PATH_NOT_COVERED" message. After receiving this message, the client may request a referral. When the client requests a referral, the DFS service 715 may sniff the top-level directory of one link target for each replica group associated with the aggregated link to determine if the next component of the path is found on the replica group. Sniffing refers to opening a connection to the DFS servers hosting directories associated with the aggregated link and performing a directory listing of the top-level directory. A sniff may be carried out in a system or admin context of the DFS server and by simply opening the folder for read, share everything. For this to work properly, the DFS service 715 may need sufficient rights on the DFS servers hosting the aggregated links.

When a server is found that has the next component of the path, a referral may be returned that includes a source path and a target path. The source path may include components after the link component. For example, if a client requested a referral for \\DFSServer\DFS\link\a\file.txt, a referral may include:

\\DFSServer\DFS\link\a→\\SMBServer2\SMBShare2\a, (where → indicates "maps to") instead of simply:

\\DFSServer\DFS\link→\\SMBServer2\SMBShare2.

This may be done because of the caching in which the client may engage. For example, if the referral included \\DFSServer\DFS\link→\\SMBServer2\SMBShare2, the client may cache this. Later when the client wanted to open a file \\DFSServer\DFS\link\b\file2.txt, the client might just rewrite \\DFSServer\DFS\link with \\SMBServer2\SMBShare2. If the "b" directory was included on another server (e.g., \\SMBServer3\SMBShare3) because of being an aggregated link, this may not function properly unless done in the manner described above.

Furthermore, the referral may include a list including paths for all servers of a replica group to increase fault tolerance and provide lower cost options. These paths may be ordered by cost as previously discussed.

In addition, the sniffing may be done in altitude order from highest to lowest. In other words, the altitude may impose an ordering in which the DFS service 715 sniffs the target servers. Furthermore, if the next component of the path is found on a sniffed server, sniffing may stop at that point.

When a client requests to open a link itself (e.g., \\DFSRootServer\DFSRoot\Link) instead of a file within the link (e.g., \\DFSRootServer\DFSRoot\Link\File.Txt), the DFS server component 720 may first determine if the link is an aggregated link. If the link is an aggregated link, the DFS server component 720 may satisfy the open itself and attach a context to the open. A client may request to open a link itself before the client performs a directory listing, for example. Context, in this sense, is data that is associated with the open which is presented to the DFS server component 720 whenever additional operations regarding the open are received. The DFS server component 720 may update and read data stored in the context. In particular, the DFS server component 720 may indicate in the context that the open relates to an aggregated link.

After opening the link, the client may then send a query directory information request for the open link. In response, the DFS server component 720 may examine the context and determine that the open relates to an aggregated link. If the open relates to an aggregated link, the DFS server component 720 may request that the DFS service 715 open connections to each of the servers associated with the aggregated links (or from one member of each replica group), obtain the directory information, and concatenate the directory information.

In one embodiment, the DFS service 715 may also cache directory information or other sniffing information it obtains. The cached information may be persisted over reboots. When the DFS service 715 receives a request for directory information or a request to open a file, the DFS service 715 may consult the cache and obtain the directory information therefrom as appropriate. The memory for the cache may be reclaimed in a least recently used (LRU) manner, for example, with a pre-determined TTL for the amount of time a result is cached to prevent entries from going stale. TTLs may be specified on a link-by-link basis.

When a client attempts to create a new file on an aggregated link target, one solution is to fail the open. This may work well in publishing scenarios. New folders may be created via directly targeting a specific server that hosts a share.

In another implementation, a create may be accommodated by creating the folder on the highest altitude link target or by load balancing creates across link targets. This may be performed by a round-robin approach, picking a random target, or other load balancing algorithm.

The concepts described above with respect to link aggregation may also be extended to root aggregation. Some applications of distributed file systems may have a large number of files directly under a DFS root. For example, a symbols server for software development may have hundreds of thousands of directories directly below a DFS root. By introducing another component into the path, link aggregation may be used to distribute the directories across multiple servers. In some scenarios, however, adding another component to the path may be undesirable.

In one embodiment, multiple servers may be designated as root targets of a DFS root. For example if \\ntdev\symbols is a domain symbols DFS root with multiple root targets, multiple root targets (e.g., \\symbols\symbols, \\symbols2\symbols . . . \\symbolsN\symbols) may be created. The larger the value of N, the more the symbol server may scale.

A client may still continue to access files as described previously by requesting a domain controller referral, requesting DFS root referral, and attempting to open file on a DFS root target. When the client attempts to open a file on a DFS root target, the DFS root server that executes on the DFS root target may sniff to see which DFS root target hosts the file. If the file is hosted on a different DFS root target, the DFS root server may indicate that the client needs another referral by sending a message (e.g., STATUS_PATH_NOT_COV-ERED) to the client. When the client requests the referral, the DFS root server may provide a referral that includes the other DFS root target.

For example, assume \\ntdev\symbols is a domain name that has root targets of \\symbols\symbols and \\symbols2\symbols. Further assume that \\symbols\symbols hosts the folder A, B, C and \\symbols2\symbols hosts the folders D, E, F. The following actions may occur when the client attempts to access \\symbols\symbols\A:

1. The domain is resolved to a list of domain controllers and the client selects one of the domain controllers (e.g., \\ntdevDC1\symbols).

2. The client communicates with the selected domain controller and obtains a referral to \\symbols\symbols.

3. \\symbols\server receives the request and returns STATUS_PATH_NOT_COVERED.

4. The client gets a root referral to \\symbols2\symbols, \\symbols\symbols to try in that order.

5. The client attempts to access \\symbols2\symbols\A.

6. The DFS filter on \\symbols2\symbols traps the access to the root folder in the pre-create.

7. The DFS filter communicates to the DFS service which sniffs for \A on all the root targets until \A is found. Alternatively, the DFS service may maintain and consult a database to find a root target. Assume that \\symbols\symbols is discovered to host \A.

8. A message indicating that the client should request a referral (e.g., STATUS_PATH_NOT_COVERED) is returned to the client.

9. The client requests the referral.

10. The client gets a referral for \\symbols2\symbols\A to \\symbols\symbols\A

11. The client may then access \\symbols\symbols\A.

To indicate that a root is aggregated, a flag may be set (e.g., PKT_ENTRY_TYPE_AGGREGATED). Similarly, an altitude may be added to indicate which servers are replicas and which are not. The altitude may be used to determine which folder to make visible to a client when there is a conflict at the root level of the target.

If a client opens the root itself (e.g., through a dir), the DFS server component in conjunction with the DFS service may aggregate directories from multiple servers into a list and return the list to the client.

While the components of FIGS. 6 and 7 are shown as separate, in other embodiments, they may be combined in whole or in part and/or broken into additional components. Furthermore, while a line is drawn showing user mode processes and kernel mode processes, in other implementations, components shown in kernel mode may execute in user mode and/or vice versa without departing from the spirit or scope of aspects of the subject matter described herein.

Figure 9:
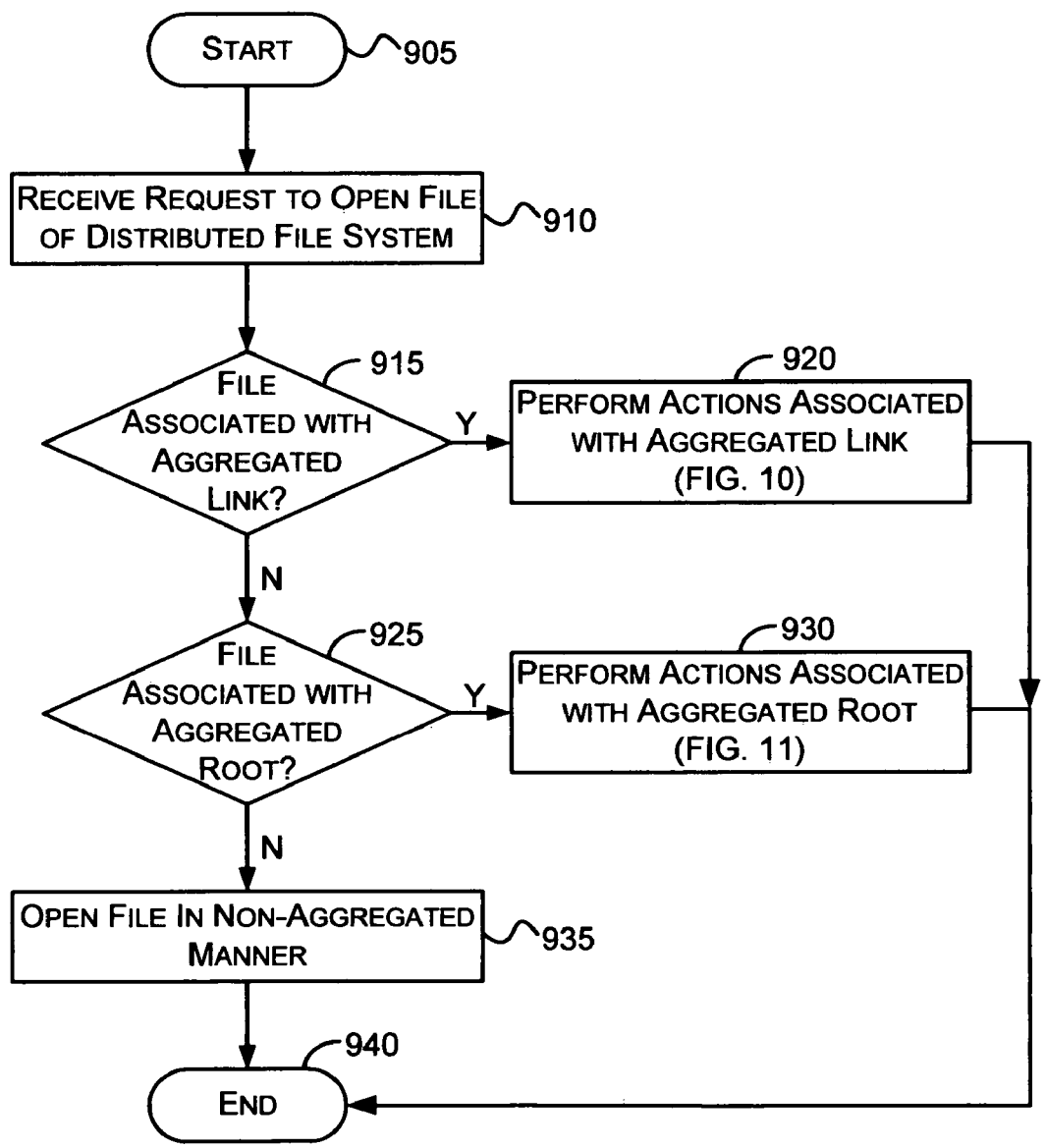
FIGS. 9-11 are flow diagrams that generally represent actions that may occur in accessing aggregated files in accordance with aspects of the subject matter described herein.
Figure 10:
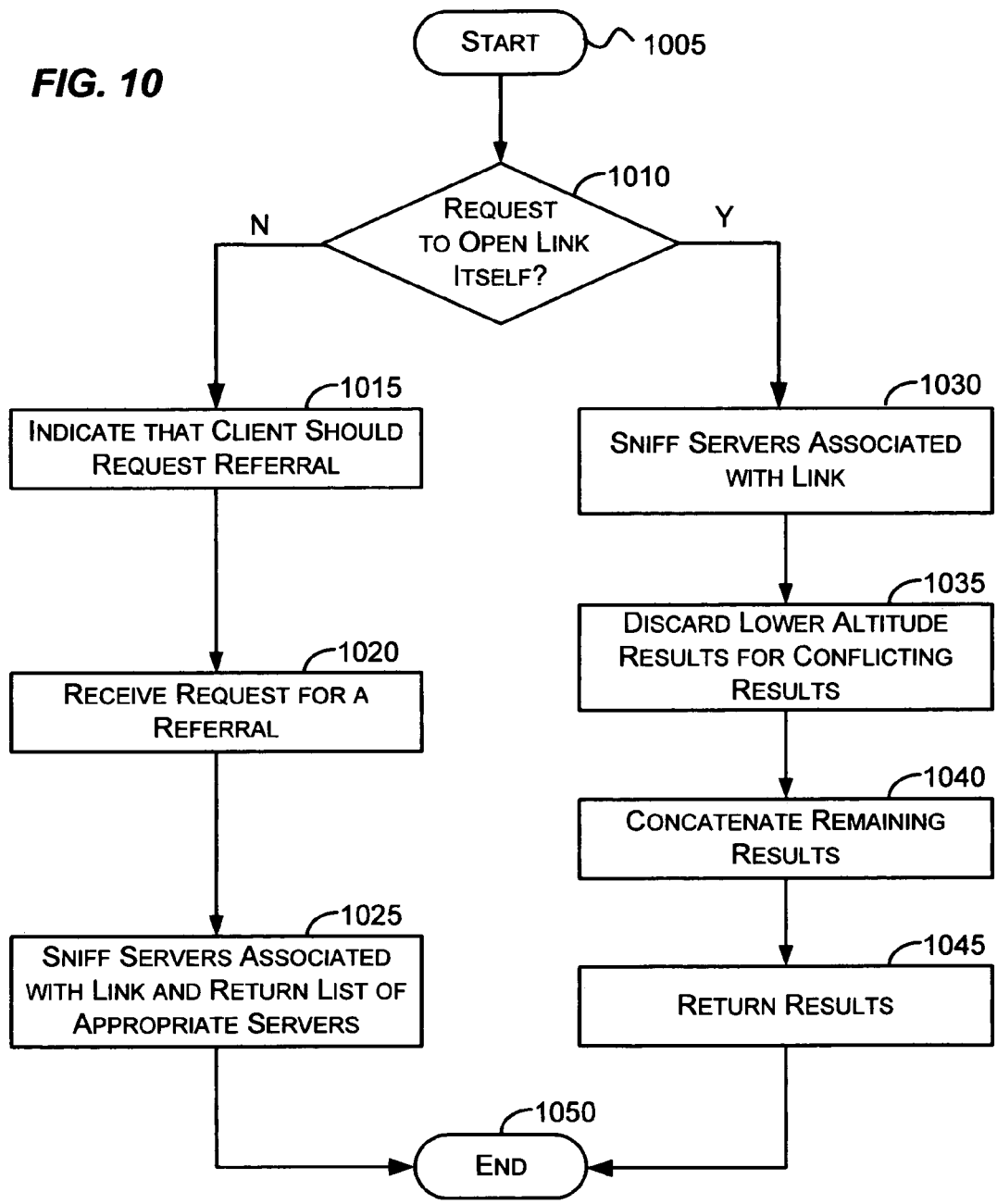
Figure 11:
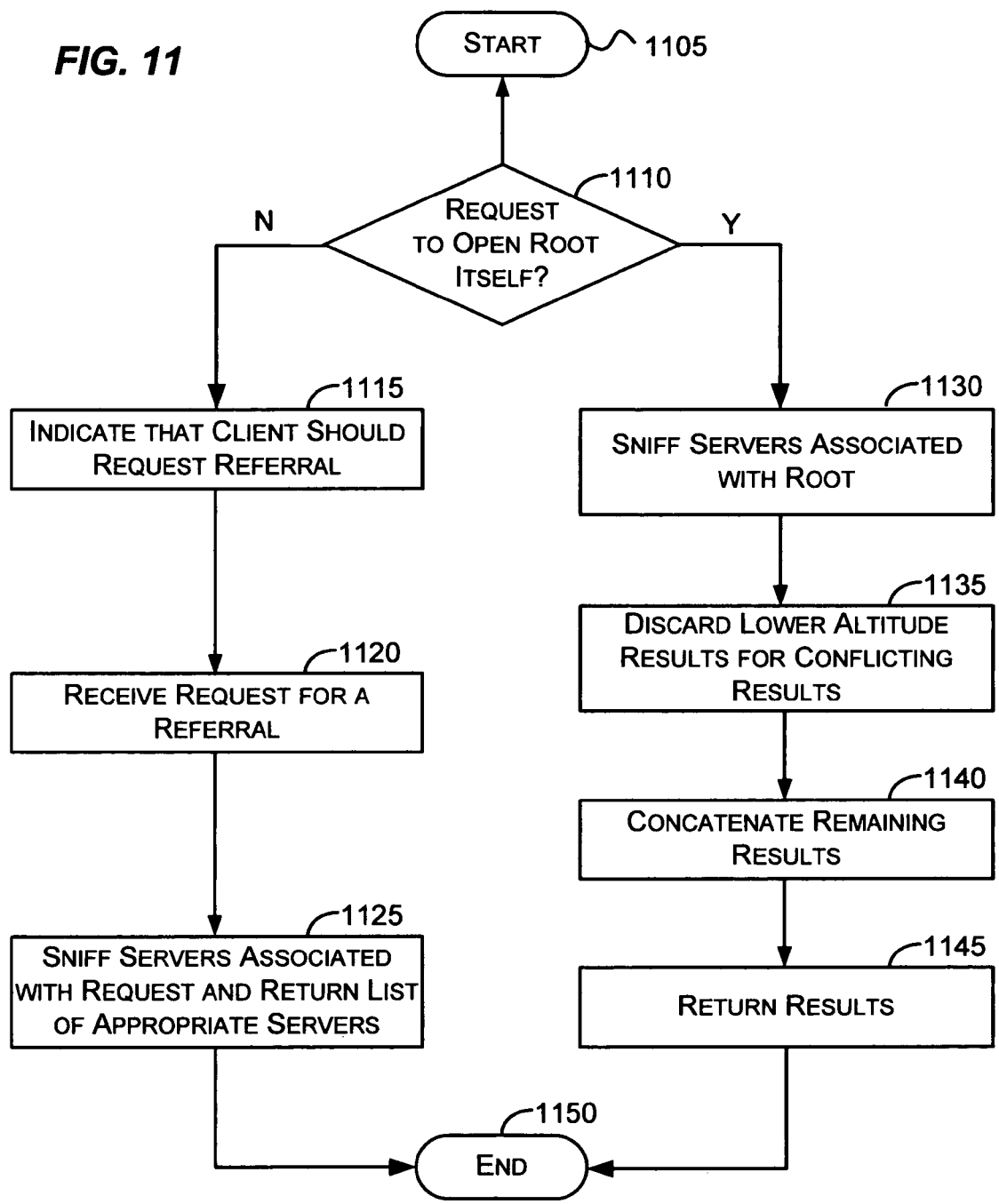

FIGS. 9-11 are flow diagrams that generally represent actions that may occur in accessing aggregated files in accordance with aspects of the subject matter described herein. Turning to FIG. 9, at block 905, the actions begin.

At block 910, a request to open a file is received. At block 915, a determination is made as to whether the file is associated with an aggregated link (e.g., by checking an aggregated link flag). If so, the actions continue at block 920. If not, the actions continue at block 925.

At block 920, actions are performed to service the request as described in more detail in conjunction with FIG. 10

At block 925, a determination is made as to whether the file is associated with an aggregated root (e.g., by checking an aggregated root flag). If so, the actions continue at block 930; otherwise, the actions continue at block 935.

At block 935, the file may be opened or other actions taken to open the file without concern for whether the file is associated with an aggregated link or aggregated root.

At block 940, the actions end.

Turning to FIG. 10, at block 1005, the actions begin. At block 1010, a determination is made as to whether the request is to open the link itself. If so, the actions continue at block 1030; otherwise, the actions continue at block 1015. As noted above, a request to open the link itself may occur just prior to performing a dir of the link, for example.

At block 1015, a message is sent to the client (e.g., STATUS_PATH_NOT_COVERED) that indicates that the client should request a referral. At block 1020, the request for a referral is received. In response, at block 1025, the server sniffs servers associated with the link (e.g., that host files associated with the link) and returns a list including the appropriate servers.

Between blocks 1010 and 1030, the server may absorb the open (e.g., indicate that the open completed successfully) and attach a context to the open. If the server does not receive a subsequent request to enumerate the open (e.g., a dir), the actions associated with blocks 1030-1045 may not occur. Otherwise, when the server receives a request to enumerate the open, at block 1030, in response to the request, the server sniffs the servers associated with the link. At block 1035, for conflicting results (i.e., same path and name), results are discarded from servers associated with lower altitude. At block 1040, the remaining results are concatenated. At block 1045, the results are returned.

At block 1050, the actions associated with FIG. 10 end.

Turning to FIG. 11, at block 1105, the actions begin. At block 1110, a determination is made as to whether the request is to open the root itself. If so, the actions continue at block 1130; otherwise, the actions continue at block 1115. As noted above, a request to open the root itself may occur just prior to performing a dir of the root, for example.

At block 1115, a message is sent to the client (e.g., STATUS_PATH_NOT_COVERED) that indicates that the client should request a referral. At block 1120, the request for a referral is received. In response, at block 1125, the server sniffs servers associated with the link (e.g., that host files associated with the link) and returns a list including the appropriate servers.

Between blocks 1110 and 1130, the server may absorb the open and attach a context to the open. If the server does not receive a subsequent request to enumerate the open (e.g., a dir), the actions associated with blocks 1130-1145 may not occur. Otherwise, when the server receives a request to enumerate the open, at block 1130, in response to the request, the server sniffs the servers associated with the root. At block 1135, for conflicting results (i.e., same path and name), results are discarded from servers associated with lower altitude. At block 1140, the remaining results are concatenated. At block 1145, the results are returned.

At block 1150, the actions associated with FIG. 11 end.

With respect to the actions described in conjunction with FIGS. 10 and 11, it should be understood that in addition, or in lieu of, sniffing the server may consult a database that it maintains to obtain the relevant information.

In addition, it should be understood that the actions described in conjunction with FIGS. 9-11 are not all-inclusive of all the actions a server or client may take in accessing a file of a distributed file system. Furthermore, although the actions are described as occurring in a particular order, in other embodiments, some of the actions may occur in parallel or may be performed in another order without departing from the spirit or scope of the subject matter described herein.

As an optimization, a DFS server may take into account network cost when it sniffs aggregated targets that are also replicated: the replica that is the least cost from the server may be chosen for the sniff. Furthermore, the results of the sniff may be cached in a database with an associated TTL or other policy for refreshing the results.

As can be seen from the foregoing detailed description, aspects have been described related to accessing files in a distributed file system. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A computer-readable memory storage medium having stored computer-executable instructions, comprising:
   receiving a request from a client to open a file of a distributed file system, wherein the request comprises a path to the file, the path containing an aggregated link;
   determining that the path contains the aggregated link, wherein the aggregated link corresponds to a first folder of the distributed file system, the first folder representing a plurality of other folders that are not subfolders of the first folder and that are not replicas of each other, the plurality of other folders being stored on a plurality of servers such that each of the plurality of servers hosts files corresponding to the first folder of the distributed file system, and such that one or more files that correspond to the first folder that are stored on a first server of the plurality of servers are different from one or more files that correspond to the first folder that are stored on a second server of the plurality of servers;
   sending a message to the client indicating that the client should request a referral;
   upon receiving a request for the referral, determining which of the plurality of servers stores the requested file;
   constructing the referral to include a source path and a target path to the server that stores the requested file, wherein the source path includes the components of the request before the aggregated link, the aggregated link, and the next component after the aggregated link, and wherein the target path contains components to which the components of the request before the aggregated link and the aggregated link map as well as the next component after the aggregated link;
   wherein a group, of servers that each store a replica of a file associated with an aggregated link is a replica group, and further comprising:
      receiving a request to query directory information of a directory under which the requested file is stored;
      requesting directory information from a server from each replica group of the plurality of servers associated with the aggregated link;
      concatenating the directory information into a response including discarding conflicting directory information, wherein discarding conflicting directory information comprises determining altitudes of the servers associated with the conflicting directory information, wherein one server has a highest altitude, and discarding directory information from servers with altitudes less than the highest altitude;
      and sending the response.

2. The computer-readable storage medium of claim 1, wherein the path is a complete universal naming convention (UNC) path to the file.

3. The computer-readable storage medium of claim 1, wherein the referral further includes a path to one or more servers on which a replica of the file is stored, and wherein the paths are ordered to load balance requests to the servers.

4. The computer-readable storage medium of claim 3, wherein the file comprises a directory.

5. A method implemented at least in part by a machine, comprising:
   receiving a request from a client to open a file of a distributed file system, wherein the request comprises a path to the file, the path containing an aggregated link;
   determining that the path contains the aggregated link, wherein the aggregated link corresponds to a first folder of the distributed file system, the first folder representing a plurality of other folders that are not subfolders of the first folder and that are not replicas of each other, the plurality of other folders being stored on a plurality of servers such that each of the plurality of servers hosts files corresponding to the first folder of the distributed file system, and such that one or more files that correspond to the first folder that are stored on a first server of the plurality of servers are different from one or more files that correspond to the first folder that are stored on a second server of the plurality of servers;
   sending a message to the client indicating that the client should request a referral;
   upon receiving a request for the referral, determining which of the plurality of servers stores the requested file;
   constructing the referral to include a source path and a target path to the server that stores the requested file, wherein the source path includes the components of the request before the aggregated link, the aggregated link, and the next component after the aggregated link, and wherein the target path contains components to which the components of the request before the aggregated link and the aggregated link map as well as the next component after the aggregated link;
   wherein a group of servers that each store a replica of a file associated with an aggregated link is a replica group, and further comprising:
      receiving a request to query directory information of a directory under which the requested file is stored;
      requesting directory information from a server from each replica group of the plurality of servers associated with the aggregated link;
      concatenating the directory information into a response including discarding conflicting directory information, wherein discarding conflicting directory information comprises determining altitudes of the servers associated with the conflicting directory information, wherein one server has a highest altitude, and discarding directory information from servers with altitudes less than the highest altitude;
      and sending the response.

6. The method of claim 5, wherein the path comprises a universal naming convention (UNC) path.

7. The method of claim 5, wherein the referral further includes a path to one or more servers on which a replica of the file is stored, and wherein the method further comprises ordering the paths according to network cost.

8. The method of claim 5, wherein the aggregated link comprises an aggregated root and wherein the plurality of other folders comprises a plurality of root folders.

9. The method of claim 8, further comprising when more than one of the plurality of root folders include an identical beginning portion of a path, determining which of the plurality of root folders to reference in the referral based on altitudes assigned to each of the root folders.

10. The method of claim 9, wherein each altitude comprises a number, wherein root folders assigned to equal altitudes are part of a single replica group.

11. An apparatus for servicing requests in a distributed file system, comprising:
a processor; and
memory storing computer executable instructions which when executed by the processor perform a method comprising:
receiving a request from a client to open a file of a distributed file system, wherein the request comprises a path to the file, the path containing an aggregated link;
determining that the path contains the aggregated link, wherein the aggregated link corresponds to a first folder of the distributed file system, the first folder representing a plurality of other folders that are not subfolders of the first folder and that are not replicas of each other, the plurality of other folders being stored on a plurality of servers such that each of the plurality of servers hosts files corresponding to the first folder of the distributed file system, and such that one or more files that correspond to the first folder that are stored on a first server of the plurality of servers are different from one or more files that correspond to the first folder that are stored on a second server of the plurality of servers;
sending a message to the client indicating that the client should request a referral;
upon receiving a request for the referral, determining which of the plurality of servers stores the requested file;
constructing the referral to include a source path and a target path to the server that stores the requested file, wherein the source path includes the components of the request before the aggregated link, the aggregated link, and the next component after the aggregated link, and wherein the target path contains components to which the components of the request before the aggregated link and the aggregated link map as well as the next component after the aggregated link;
wherein a group of servers that each store a replica of a file associated with an aggregated link is a replica group, and further comprising:
receiving a request to query directory information of a directory under which the requested file is stored;
requesting directory information from a server from each replica group of the plurality of servers associated with the aggregated link;
concatenating the directory information into a response including discarding conflicting directory information, wherein discarding conflicting directory information comprises determining altitudes of the servers associated with the conflicting directory information, wherein one server has a highest altitude, and discarding directory information from servers with altitudes less than the highest altitude;
and sending the response.

12. The apparatus of claim 11, wherein the method is performed by a server component that acts as a file system filter arranged to execute in kernel mode to receive the requests.

13. The apparatus of claim 11, wherein the method is performed by a process arranged to execute in user mode.

14. The apparatus of claim 11, further comprising a database arranged to store results from sniffing on other servers of the distributed file system.

15. The apparatus of claim 11, wherein to the method further comprises aggregating a directory structure of an entire distributed file system into a single namespace.

* * * * *